(12) United States Patent
Shmidov et al.

(10) Patent No.: US 11,928,462 B2
(45) Date of Patent: Mar. 12, 2024

(54) SYSTEM AND METHOD FOR ASSOCIATING LOGS TO REPOSITORIES USING SOURCE CODE

(71) Applicant: Intuit Inc., Mountain View, CA (US)

(72) Inventors: Elad Shmidov, Kfar Saba (IL); Margarita Vald, Petah Tikva (IL); Yerucham Meir Berkowitz, Givat Shmuel (IL); Boaz Sapir, Petah Tikva (IL); Liron London, Petah Tikva (IL); Dan Sharon, Kefar-Saba (IL); Vadim Belov, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 214 days.

(21) Appl. No.: 17/589,653

(22) Filed: Jan. 31, 2022

(65) Prior Publication Data
US 2023/0244474 A1    Aug. 3, 2023

(51) Int. Cl.
*G06F 16/00* (2019.01)
*G06F 8/70* (2018.01)

(52) U.S. Cl.
CPC ..................... *G06F 8/70* (2013.01)

(58) Field of Classification Search
CPC . G06F 8/70; G06F 8/71; G06F 16/248; G06F 16/2358; G06F 16/215; G06F 16/3344; G06F 16/355; G06F 16/24568; G06F 16/24; G06F 16/113; G06F 11/1448; G06F 11/14; G06F 11/1471; G06F 11/1469; G06F 16/00; G06F 7/08; G06F 2201/80; G06F 2201/84; G06N 20/00
See application file for complete search history.

(56) References Cited

U.S. PATENT DOCUMENTS

| | | | |
|---|---|---|---|
| 2016/0299934 A1* | 10/2016 | Karandikar | G06F 16/248 |
| 2017/0185576 A1* | 6/2017 | Agarwal | G06N 20/00 |
| 2017/0212902 A1* | 7/2017 | Graefe | G06F 16/113 |
| 2022/0405535 A1* | 12/2022 | Bhatia | G06N 20/10 |

* cited by examiner

*Primary Examiner* — Yicun Wu
(74) *Attorney, Agent, or Firm* — Ferguson Braswell Fraser Kubasta PC

(57) ABSTRACT

A method includes receiving event strings from source code repositories, creating, for the source code repositories, digests of keywords, receiving log strings, and aggregating the log strings into a log group. The method further includes comparing the digests to the log group to generate scores, whereby the scores correlate the digests to the log group. The method further includes selecting a source code repository from the source code repositories according to the scores, and associating the log group to a service corresponding to the source code repository, where the source code repository corresponds to the digest with a highest score.

20 Claims, 9 Drawing Sheets

```
121
122 func pushToQueueToReopenJiraTicket(jiraId string) error {                                    ┌─501
123         trigger := ReportTrigger{TicketID: jiraId}
124         return queue.PushInterface(trigger)
125 }
126
127 func updateStatus(request UpdateStagusRequest) (*events.APIGatewayProxyResponse, error) {
128         var resp events.APIGatewayProxyResponse
129
130         d, err := db.GetDefect(request.Client, request.UniqueIdentifier)
131         switch {
132         case err == sql.ErrNoRows:
133                 resp, err = utils.ClientError(http.StatusBadRequest, "No defect found with this unique_identifier")
134         case err != nil:
135                 return nil, err
136         case d.Status == StatusPendingApproval:
137                 err = db.UpdateDefectStatus(request.Client, request.UniqueIdentifier, request.Status)
138                 if err != nil {
139                         return nil, err
140                 }
141
142                 if request.Status == StatusApproved {
143                         trigger := ReportTrigger{
144                                 DefectID: d.ID,
145                         }
146                         if err = queue.PushInterface(trigger); err != nil {
147                                 return nil, err
148                         }
149                         resp.StatusCode = http.StatusAccepted
150                 } else {
151                         resp.StatusCode = http.StatusOK
152                 }
153
154                 body, _ := json.Marshal(BasicDefectResponse{
155                         DefectStatus: request.Status,
156                 })
157                 resp.Body = string(body)
158         default:
159                 resp, err = utils.ClientError(http.StatusBadRequest,
160                         fmt.Sprintf("Defect with status '%s' can't be updated", d.Status))
```

*FIG. 5A*

| i | Time | Event |
|---|---|---|
| > 1 | 1/26/22<br>6:50:48.892 AM | 92aea40f-afba-493b-aa12-7cb285fb74f7: Info: utils.go:25: Client error: 404: No defect found with unique_identifier<br><br>account = 485971637044 | host = hec-int-us-west-2.prd.cmn.cto.a.intuit.com | index = sdm<br>loggroup = /aws/lambda/ticket-manager-prod-reporter-api | punct= ----:--::--_:_:<br>source = http.lambda_logs_noack | sourcetype = intuit:cloudwatch |

*FIG. 5B*

SYSTEM AND METHOD FOR ASSOCIATING LOGS TO REPOSITORIES USING SOURCE CODE

BACKGROUND

In computer systems, a log file is a file that may be produced automatically when certain events occur in the system. Log files may be time-stamped and record events that occur during the execution of software applications, which may be referred to as services. Log files may record events (e.g., messages or transactions occurring between different users, events that occurred during a backup, errors that stopped an application from running, files that have been requested by users from a website, and the like).

Log files are used to perform analytics of systems that generated the log files and detect errors in a target system. Events in the log files may originate by one service and stored in the log file by another service of the target system. In such a scenario, the stored event may not properly indicate the originating service that caused the event. For example, the stored event may store the identifier of the second service that stored the event in the log file. In large enterprises systems and server farms that have more than thousands, tens of thousands, or more services executing, and multiple log files, a challenge is to identify the service that generated events recorded in a particular log file.

SUMMARY

In general, in one aspect, one or more embodiments relate to a method that includes receiving event strings from source code repositories, creating, for the source code repositories, digests of keywords, receiving log strings, and aggregating the log strings into a log group. The method further includes comparing the digests to the log group to generate scores, whereby the scores correlate the digests to the log group. The method further includes selecting a source code repository from the source code repositories according to the scores, and associating the log group to a service corresponding to the source code repository, where the source code repository corresponds to the digest with a highest score.

In general, in one aspect, one or more embodiments relate to a system that includes a repository storing source code repositories, and log files. The system also includes a processor in communication with the system repository, a repository search controller, when executed by the processor, configured to receive event strings from the source code repositories, a digest controller, when executed by the processor, configured to create, for the source code repositories, digests of keywords, and a log controller, when executed by the processor, configured to receive log strings and aggregate the log strings into a log group. The system also includes a scoring controller, when executed by the processor, configured to compare digests to the log group to generate scores correlating the digests to the log group, select a source code repository from the source code repositories according to the scores, and associate the log group to a service corresponding to the source code repository, wherein the source code repository corresponds to the digest with a highest score.

In general, in one aspect, one or more embodiments relate to a method that includes receiving event strings from source code repositories, creating, for the source code repositories, digests of keywords, receiving log strings, aggregating the log strings to a log group, comparing the digests to the log group to generate scores correlating the digests to the log group, and associating the log group to a service corresponding to a source code repository selected from the source code repositories using the scores. The method further includes receiving from a user interface a request associated with a user-selected log event, the user-selected log event comprising a first log string and first metadata, determining from the first metadata a first log group associated with the metadata, and transmitting to the user interface a notification message identifying a service associated with the first log group.

Other aspects of the disclosed system and method will be apparent from the following description and the appended claims. Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

BRIEF DESCRIPTION OF DRAWINGS

Specific embodiments of the disclosed system and method will now be described in detail with reference to the accompanying figures. Like elements in the various figures are denoted by like reference numerals for consistency.

FIG. 5A illustrates an example of source code containing an event string according to one or more embodiments.

FIG. 5B illustrates an example of a log containing an log string according to one or more embodiments.

DETAILED DESCRIPTION

Figure 1:
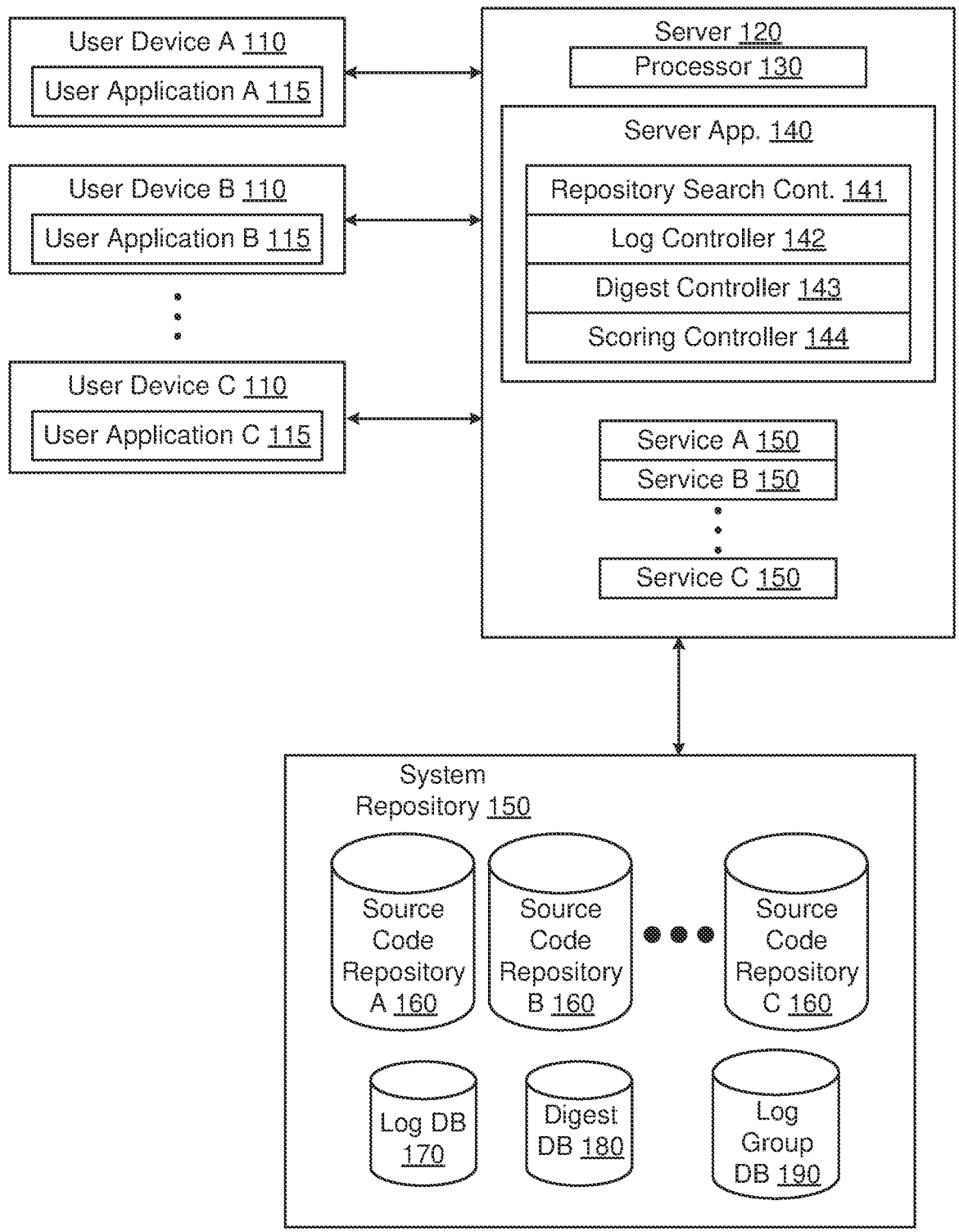
FIG. 1 illustrates a cloud-based log management system according to one or more embodiments of the disclosure.

In the following detailed description of embodiments of the disclosed system and method, numerous specific details are set forth to provide a more thorough understanding of the disclosed system and method. However, it will be apparent to one of ordinary skill in the art that the disclosed system and method may be practiced without these specific details. In other instances, well-known features have not been described in detail to avoid unnecessarily complicating the description.

In general, embodiments of the present disclosure are directed to a technique to match a service that generated events in a log file to the log file. To perform the match, embodiments use both the log files and the source code repositories of the services of a system. A source code repository stores the source code that defines the service. For example, the source code repository may be the file or set of files that have the source code for the service. Thus, rather than trying to identify the service that generated the event from the log file itself, one or more embodiments match the source code defining the service to the log file, and based on the match, identify the service that matches the log file.

For each particular source code repository, a unique set of keywords is extracted that together form a digest for the particular source code repository. Further, features of log files based on log metadata are aggregated into log groups which indicates the aggregated logs came from the same service. A scoring function is then used to generate scores from the keywords in the digest and the keywords in the aggregated logs. The scores correlate the source code repositories with the log groups. For a particular log group and service, the highest ranking source code repository is identified as the creator of log group. Being a creator of the log group means that the majority of events found in the logs come from source code within the source code repository.

More specifically, one or more embodiments perform the following operations. For each source repository, the disclosed system and method collect the strings above a threshold length in the source code repository. Next, the disclosed system and method enhance the collected event strings by removing common strings, which are collected from the repositories. The strings that appear above a threshold amount are removed. Then, the disclosed system and method aggregate logs into log groups using metadata available in each log line to indicate the logs originated from the same source code. Examples for such metadata can be log index, instance hostname, and the like.

Further, for each created log group, the disclosed system and method score the log group against the source code repository digests. The scoring searches for matches between the repository digest and the log groups. The score may be based on the sum of all the matches between the log group and the digest, where each match's score is based on: i) the match length (the longer the match, the higher the score); ii) the number of occurrences of the keyword in other digests (the fewer the occurrences, the higher the score); and iii) the number of occurrences of the keyword in other log groups (the fewer the occurrences, the higher the score). Then, the disclosed system and method associate each log group with the highest rank source code repository.

In some embodiments, by using source code repository in identifying the service associated with logs rather than just using the log files themselves as in the classic method, one or more embodiments improve the computer systems accuracy in the identification. For example, the accuracy may be improved from 25% when log files are considered by themselves to 95% by using the source code repositories in conjunction with the log files, and the scoring technique disclosed herein.

FIG. 1 illustrates a log management system (100) according to one or more embodiments of the disclosure. The system (100) shown in FIG. 1 may be implemented as hardware, software, or a combination thereof. The log management system (100) includes the user device A (110), the user device B (110), the user device C (110), the system repository (150), and the server (140) in accordance with one or more aspects of the disclosed system and method. In general, a data repository is one or more storage units (e.g., database, file system, or other storage structure) and/or hardware or virtual device(s) (e.g., non-transitory computer readable storage medium, memory, cloud storage, storage server, etc.) for storing data. A data repository may include multiple homogeneous or heterogeneous storage units or devices. In one embodiment, one or more of the system repository (150) and the server (140) may be cloud-based components.

The system repository (150) stores files and other information in accordance with one or more embodiments. In particular, the system repository (150) may include the source code repository A (160), the source code repository B (160), and the source code repository C (160), that store source code that contains event strings. The source code defines an event string, which is the output string stored in a log file and generated by a service in execution when an event occurs. The service is the executable defined by the source code. The system repository (150) may also include a log database (170), a digest database (180), and a log group database (190). The log database (170) stores log strings that are generated by the source code in the source code repositories (160) during execution of a service associated with the source code. The digest database (180) stores digests of the event strings from the source code repositories (160) that are generated according to the principles of the present disclosure and described below. The log group database (190) stores log groups containing logs that are aggregated using metadata available in each log line to indicate the logs originated from the same source code.

The server (120) includes a processor (120) and the server application (140), which includes a repository search controller (141), a log controller (142), a digest controller (143), and a scoring controller (144). The repository search controller (141), a log controller (142), a digest controller (143), and a scoring controller (144) are executable by the server (120).

The server (120) further includes the service A (150), the service B (150), and the service C (150). The user devices A, B, and C (110) include and execute a corresponding one of the user applications A, B, and C (115). Each of the user applications (115) is configured to request the server (120) to perform a selected service by executing one of the services A, B, and C (150). By way of example, a user operating the user device A (110) may cause the user application A (115) to request the server (120) to fetch a webpage by executing the service A (150). In executing the service A (150), the server (120) may generate log strings that are stored in a log file in the log database (170).

Figure 2:
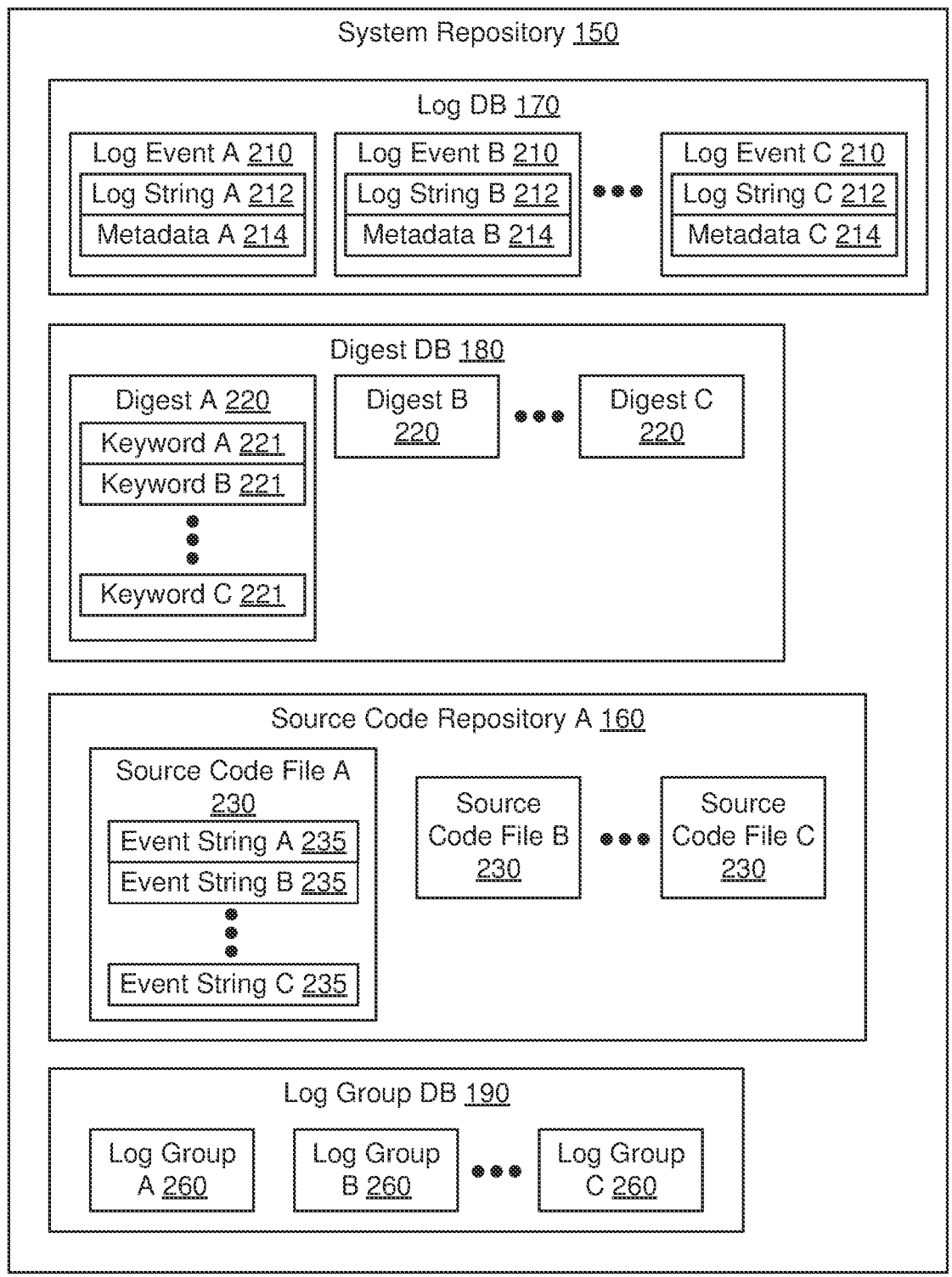
FIG. 2 illustrates a system repository according to one or more embodiments of the disclosure.

FIG. 2 illustrates a system repository (150) according to one or more embodiments of the disclosure. FIG. 2 depicts the components in FIG. 1 in greater detail. The log database (170) includes the log event A (210), the log event B (210), and the log event C (210). A "log event" is a record of an event occurring at a source location. The log events (210) include the corresponding log strings (212) and the metadata (214). For example, the metadata may include a type of event, a date stamp, a time stamp, a source, an event code, a category, a computer issuing the event, and the like. The metadata (214) is associated with the log events (210) and the log strings (212). By way of example, the log event A (210) includes the log string A (212) and the metadata A (214), the log event B (210) includes the log string B (212) and the metadata B (214), and the log event C (210) includes the log string C (212) and the metadata C (214).

The digest database (180) includes the digest A (220), the digest B (220), and the digest C (220). The digests (220) each include multiple keywords. For example, the digest A includes the keyword A (221), the keyword B (221), the keyword C (221), etc.

The log group database (190) includes multiple log groups (260), including the log group A (260), the log group B (260), the log group C (260), etc. A log group (260) is a grouping of multiple log files. The log files are aggregated into the log groups (260) using metadata. Adding a log file into a log group C (260) indicates that the log originated from a particular service (150) (of FIG. 1), which was compiled from a particular source code repository (160). In one embodiment, the log group A (260) corresponds to the service A (150) because the log strings (e.g., the log string A (212)) from a log in the log group A 260 match the event strings (e.g., the event string A (235)) used to generate the digest (e.g., the digest A 220)) that corresponds to the same service (e.g., the service A (150)).

The source code repositories (160) in FIG. 1 include multiple source code files. By way of example, the source code repository A (160) includes N source code files (230), such as source code file A (230), source code file B (230), and source code file C (230). Each of the source code files (230) includes N event strings (235), such as the event string A (235), the event string B (235), and the event string C (235). An event string (235) is a string of text that is saved to a log file when an event occurs and is logged by a service.

Figure 3:
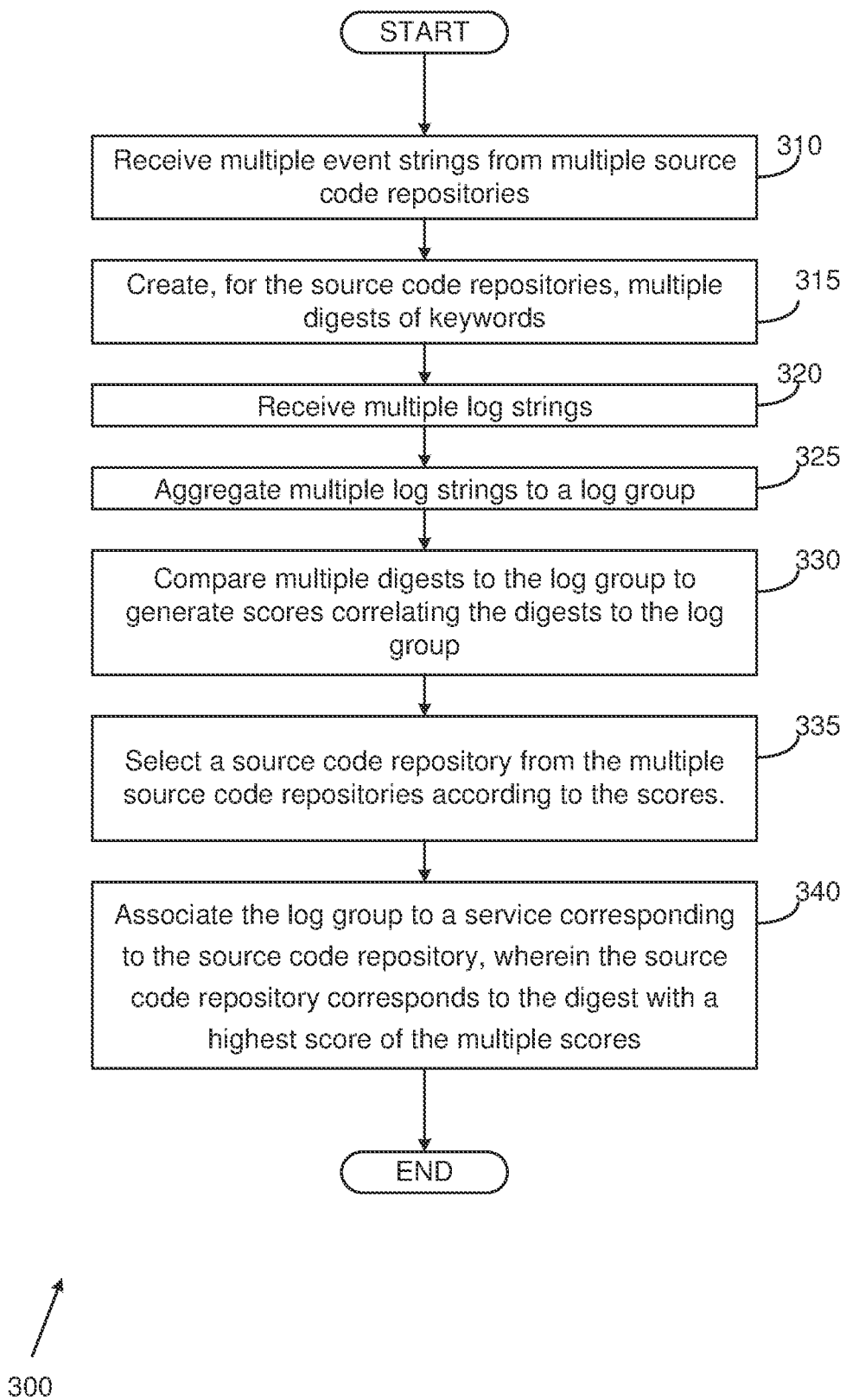
FIG. 3 illustrates a method according to one or more embodiments of the disclosure.

FIG. 3 illustrates a method (300) according to one or more embodiments of the disclosure. The method (300) may be performed by a server (e.g., the server (120) of FIG. 1). In Block 310, the repository search controller (141), executed by the server (120), receives the event strings (235) from the source code repositories (160). In Block 315, the digest controller (143), executed by the server (120), creates, for the source code repository (160), a digest A (220) of the keywords (221). In Block 320, the log controller (142), executed by the server (120), receives multiple log strings from the log files in the log database (170). In Block 325, the log controller (142), executed by the server (120), aggregates multiple log strings to a log group (260). In Block 330, the scoring controller (144), executed by the server (120), compares multiple digests (220), including the digest A (220), to the log group (260) to generate scores correlating the digests (220) to the log group (260). In Block 335, the scoring controller (144), executed by the server (120), select a source code repository from the multiple source code repositories according to the scores. In Block 340, the scoring controller (144), executed by the server (120), associates the log group (260) to a service corresponding to the source code repository (160), wherein the source code repository (160) corresponds to the digest A (220) with a highest score of the multiple scores.

Figure 4:
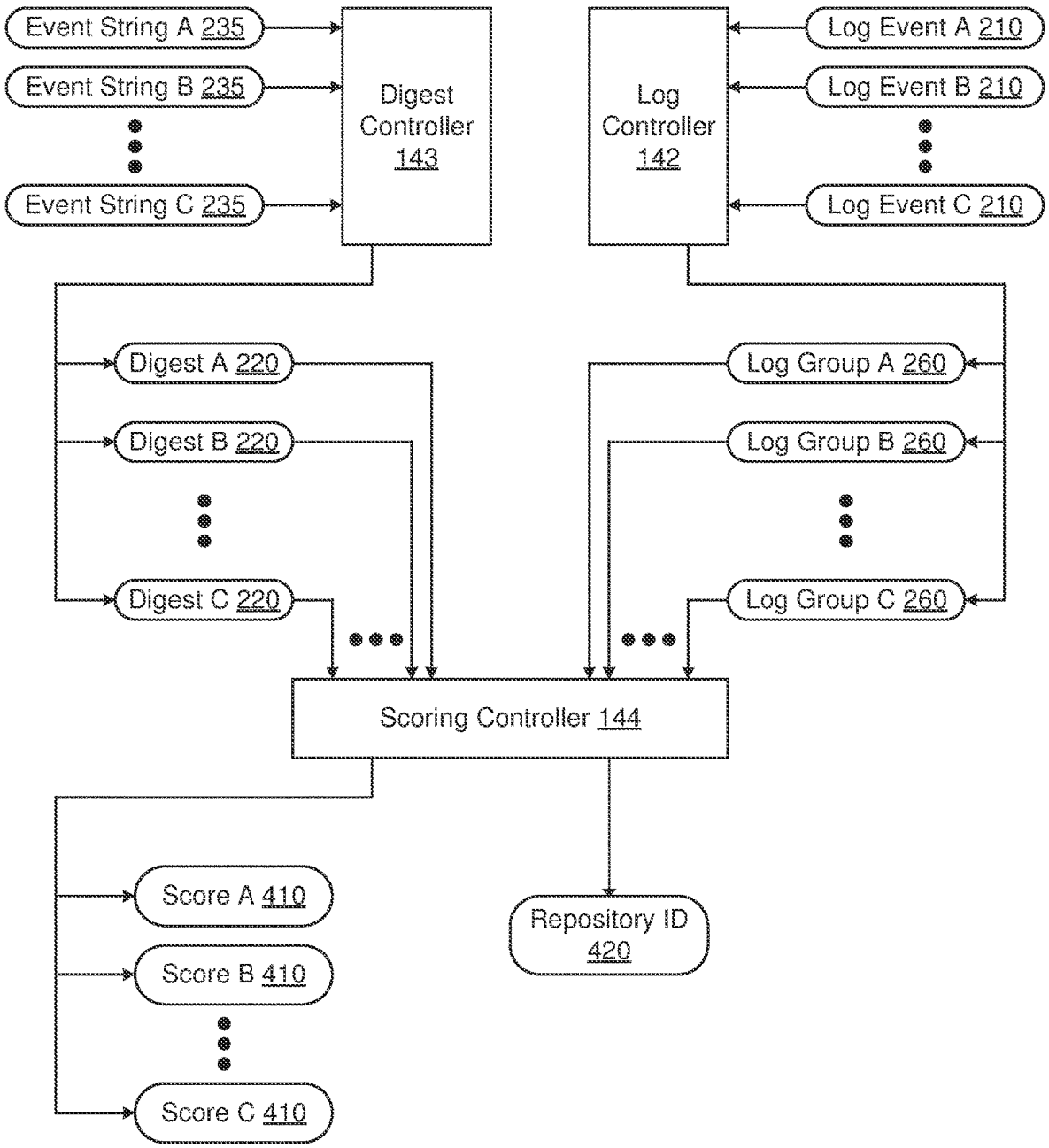
FIG. 4 illustrates a detailed system diagram according to one or more embodiments.

FIG. 4 illustrates a detailed system diagram according to one or more embodiments. The digest controller (143) retrieves the event strings (235) (including event string A (235), event string B (235), and event string C (235)) from one or more of the source code files (230) of a particular repository (160). The digest controller (143) generates, from the multiple event strings (235), multiple digests (220), which include the digest A (220), the digest B (220), and the digest C (220), by removing common strings from the event strings (235).

In an example embodiment, the digest controller (143) determines the most common strings based on the frequencies of the most common strings. The digest controller (143) may compare a frequency of an event string (235) to a threshold to determine if the event string (235) should be removed. From the remaining event strings (235), the digest controller (143) may retain the "N" longest unique strings to form the digest (220) of the keywords (221) for the repository (160), where "N" may be a system default value.

The log controller (142) retrieves the log strings (212) (including the log string A (212), the log string B (212), and the log string C (212)) from one or more of the log events (210) in the log database (170). The log controller (142) aggregates the log strings (212) into the log groups (260) using the metadata (214) available in lines of the log strings (212). By way of example, the metadata may include at least one of a log index or an instance of a hostname.

Next, the scoring controller (144) scores the log groups (260) using the source code repository digests (220) to generate the scores (410). As an example, when there are three digests and four log groups, then three scores are generated for each log group for a total of twelve scores.

The scoring controller (144) searches for matches between the repository digests (220) and the log groups (260). The longer the match between strings, the higher the score (410) for the repository (160) associated with the digest (220). The scoring controller (144) associates each log group (260) with the highest rank repository (160) by means of a repository ID (420). The association of the log group to the repository is saved and used at runtime.

In one embodiment, the score A (410) is generated by the scoring controller (144) from the digest A (220) and the log group A (260). The score A (410) is identified as the highest score for the log group A 260 and corresponds to the repository ID (420). The repository ID (420) identifies the repository from which a service was compiled and correspondingly identifies the service that generated the log group A (260).

In an example embodiment, the score A (410) includes a repository score (RepoScore$_i$) and a Levenshtein ratio$_i$ generated by the scoring controller (144) for the log group A (260). In one embodiment, the repository score (RepoScore$_i$) for the ith repository may be generated according to equation Eq. 1:

$$RepoScore_i = \sum_k \frac{len(k)}{\text{Log}_{10}(S_i) \times H_k \times RC_k} \quad \text{(Eq. 1)}$$

In Eq. 1, Len(k) is the length of the keyword k, $S_i$ is the number of keywords in the ith repository, $H_k$ is the number of hits for the keyword k, and $RC_k$ is the number of repositories that contain the keyword k.

The Levenshtein ratio$_i$ may be generated according to the formula in equation Eq. 2:

$$LevenshteinRatio_i = \frac{LD(\text{Prefix, Repo}_i)}{len(\text{Prefix})} \quad \text{(Eq. 2)}$$

In Eq. 2, LD(Prefix, Repoi) is the Levenshtein distance between Prefix and Repoi, and Len(Prefix) is the length of the host prefix. In one embodiment, the length is the number of characters in the host prefix. In one embodiment, Prefix is a portion of a path of a URL of a host that generated a log event. In one embodiment, Repoi is a portion of a path of a URL of the ith source code repository.

The Levenshtein Distance (also called "Minimum Edit distance") is a metric that measures the difference (or distance) between two strings. It is calculated by counting the number of single-character edits required to transform one string into the other string. Single-character edits can be insertions, deletions, and substitutions. The Levenshtein distance (LD) may transformed into the Levenshtein Ratio based on the length of the largest string. This gives a percentage of similarity between the two strings.

In one embodiment, the scoring controller (144) determines there are one or more repositories with a Levenshtein ratio less than 0.25. If Yes, then the scoring controller (144) uses the highest valued repository score. If No, then the scoring controller (144) uses the highest valued repository if the score is above 100.

FIG. 5A illustrates an example of source code (501) containing an event string according to one or more embodiments. The source code (501) includes an event string "No defect found with this unique_identifier" that is generated in response to a particular event and is stored as a log event in log database (170) as described above. A digest for the source code repository that includes such source code may include "defect" and "unique_identifier." Other event strings in the source code may also add to the digest.

FIG. 5B illustrates an example of a log event (502) including a log string according to one or more embodiments. The log string "No defect found with this unique_identifier" is the same as the event string in the source code (501) in FIG. 5A. The log event (502) also includes a log group identifier, namely "/aws/lambda/ticket-manager-prod-reporter-apl".

Over time, multiple logged events are logged into the log file having the log event (502) shown in FIG. 5B. The log events may be triggered by the same portion of the source code shown in FIG. 5A or by different portions of source code. When a determination is to be made as to which source code repository generated the log file, the process described herein may be performed. The match between the log event shown in FIG. 5B and the digest generated in FIG. 5A increases the likelihood to the system that the source code in FIG. 5A caused the event string in FIG. 5B. However, a single direct match may not be dispositive as the same source code developer may define the same event strings in multiple different source codes. By using the digest and using the log group, one or more embodiments provide a technique to find a correct match even when the same or similar event string is used in multiple different source codes.

Figure 5C:
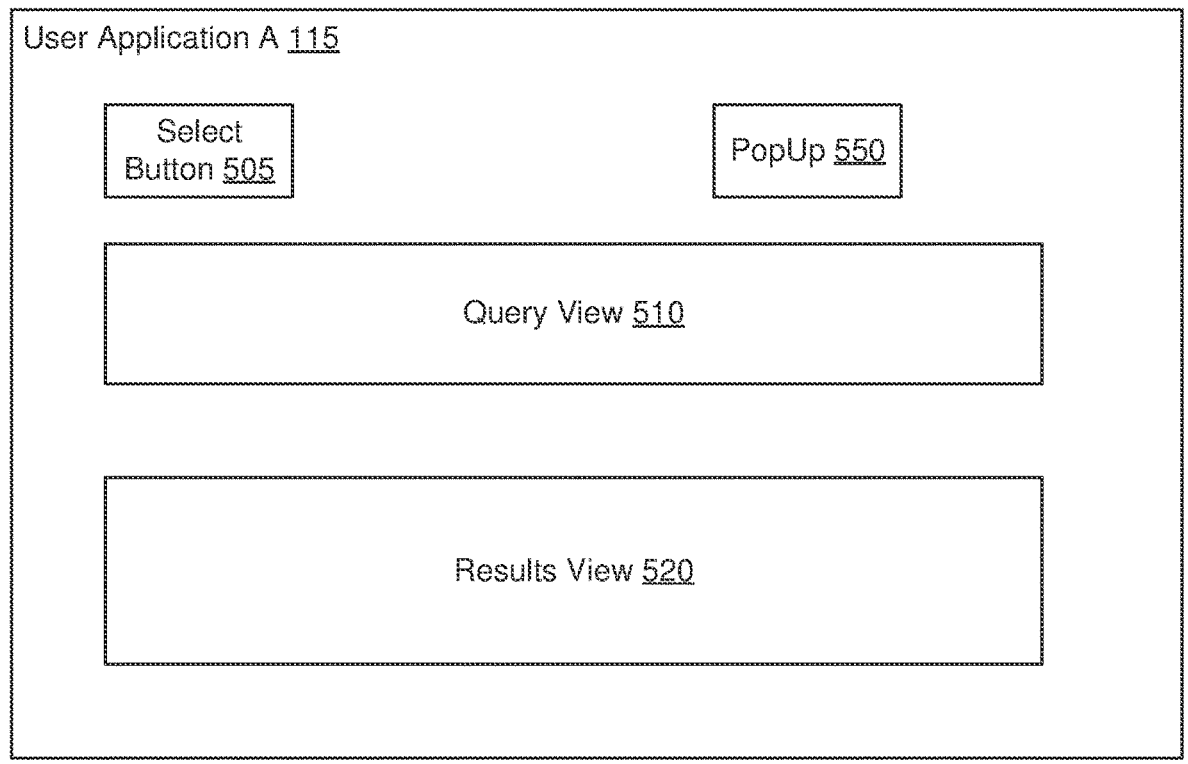
FIG. 5C illustrates a graphical user interface according to one or more embodiments.

FIG. 5C illustrates a graphical user interface according to one or more embodiments. FIG. 5C shows the user application A (115) receiving a query string in a query view window (510). In response to an event that occurs during the execution of a service (150) by the server (120), the user of a user device (110) can enter the log string associated with the event into the query view window (510). For example, the user device A (110) may execute a user application A (115) that requests a service from service A (150), resulting in an event that generates a log entry in log database (170).

The user can enter the log string into query view window (510) and enter the select button (505). In response, the server (120) is configured to compare the log string to the digests (220) to determine the source code repository (160) that produced the log string. The server (120) then displays the results in results view window (520). The results may be displayed and include a notification message that identifies a service that is associated with the log group. The server (120) may also generate a popup (550) that alerts the user that new results are available in results view window (520).

Embodiments of the disclosed system and method may be implemented on a computing system. Any combination of mobile, desktop, server, router, switch, embedded device, or other types of hardware may be used.

Figure 6:
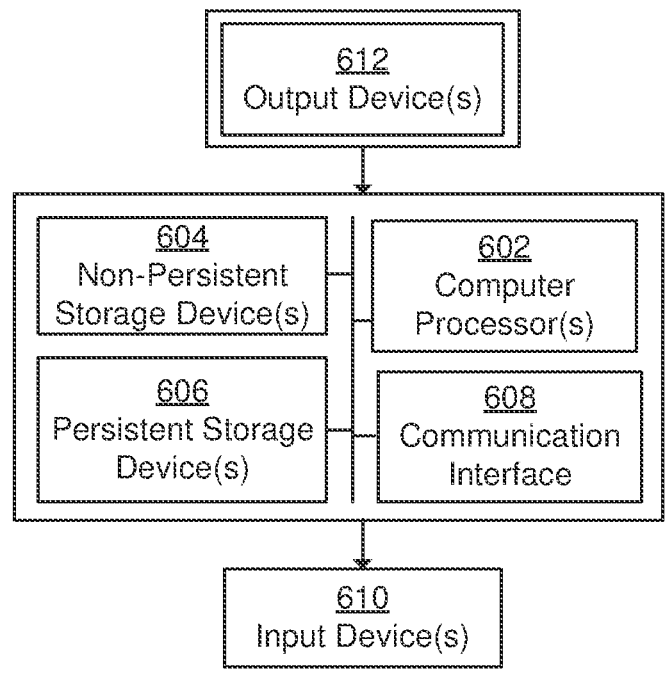
FIG. 6 illustrates computing systems in accordance with disclosed embodiments.

For example, as shown in FIG. 6, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (608) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (608) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosed system and method may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosed system and method.

Figure 7:
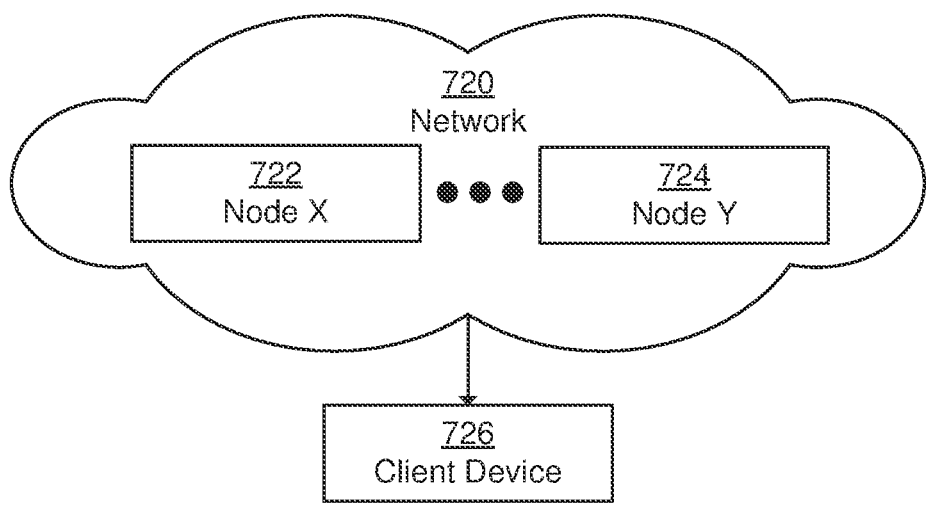
FIG. 7 illustrates computing systems in accordance with disclosed embodiments.

The computing system (600) in FIG. 6 may be connected to or be a part of a network. For example, as shown in FIG. 7, the network (720) may include multiple nodes (e.g., node X (722), node Y (724)). Each node may correspond to a computing system, such as the computing system shown in FIG. 6, or a group of nodes combined may correspond to the computing system shown in FIG. 6. By way of an example, embodiments of the disclosed system and method may be implemented on a node of a distributed system that is connected to other nodes. By way of another example, embodiments of the disclosed system and method may be implemented on a distributed computing system having multiple nodes, where each portion of the disclosed system and method may be located on a different node within the distributed computing system. Further, one or more elements of the computing system (600) may be located at a remote location and connected to the other elements over a network.

Although not shown in FIG. 7, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 6. Further, the client device (726) may include and/or perform one or more embodiments of the disclosed system and method.

The computing system or group of computing systems described in FIG. 6 and FIG. 7 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosed system and method may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the item may be obtained from persistent or non-persistent storage by the computer processor. Upon selection of the item by the user, the contents of the obtained data regarding the item may be displayed on the user device in response to the user's selection.

By way of another example, a request to obtain data regarding the item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the selected item and send the data to the device that initiated the request. Once the user device has received the data regarding the selected item, the contents of the received data regarding the item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosed system and method, may extract one or more data items from the obtained data. For example, the extraction may be performed as follows by the computing system in FIG. 6. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (including layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

The computing system in FIG. 6 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the data object and render a visual representation of the data values within a display device according to the designated rules for that data object type.

The above description of functions presents a few examples of functions performed by the computing system of FIG. 6 and the nodes and/or client device in FIG. 7. Other functions may be performed using one or more embodiments of the disclosed system and method.

While the disclosed system and method have been described with respect to a limited number of embodiments, those skilled in the art, having benefit of this disclosure, will appreciate that other embodiments can be devised which do not depart from the scope of the system and method as disclosed herein. Accordingly, the scope of the disclosure should be limited only by the attached claims.

What is claimed is:

1. A method comprising:
   receiving a plurality of event strings from a plurality of source code repositories;
   creating, for the plurality of source code repositories, a plurality of digests of keywords;
   receiving a plurality of log strings;
   aggregating the plurality of log strings into a log group;
   comparing the plurality of digests to the log group to generate a plurality of scores, the plurality of scores correlating the plurality of digests to the log group;
   selecting a source code repository from the plurality of source code repositories according to the plurality of scores; and
   associating the log group to a service corresponding to the source code repository, wherein the source code repository corresponds to the digest with a highest score of the plurality of scores.

2. The method of claim 1, wherein the plurality of scores comprises a repository score and a Levenshtein ratio.

3. The method of claim 1, wherein creating the plurality of digests comprises:
   collecting a plurality of event strings from the plurality of source code repositories.

4. The method of claim 1, wherein creating the plurality of digests comprises:
   removing a plurality of common strings from a plurality of event strings based on frequencies of the plurality of common strings.

5. The method of claim 1, wherein creating the plurality of digests comprises:
   forming the plurality of digests with a plurality of event strings using a threshold.

6. The method of claim 1, wherein aggregating the plurality of log strings comprises:
   aggregating the plurality of log strings using metadata available in lines of the plurality of log strings.

7. The method of claim 1, wherein the plurality of log strings include metadata comprising at least one of a log index and an instance of a hostname.

8. The method of claim 1, wherein comparing the plurality of digests comprises:
   comparing keywords of a plurality of digests to a plurality log groups to generate a set of scores comprising the plurality of scores.

9. The method of claim 1, wherein a higher value of the score corresponds to matching a longer string between the plurality of digests and the log group.

10. The method of claim 1, further comprising:
    receiving from a user interface a request associated with a user-selected log event, the user-selected log event comprising a first log string and first metadata;
    determining from the first metadata a first log group associated with the metadata; and
    transmitting to the user interface a notification message identifying a service associated with the first log group.

11. A system comprising:
    a system repository storing:
      a plurality of source code repositories, and
      a plurality of log files;
    a processor in communication with the system repository;
    a repository search controller, when executed by the processor, configured to receive a plurality of event strings from the plurality of source code repositories;
    a digest controller, when executed by the processor, configured to create, for the plurality of source code repositories, a plurality of digests of keywords;

a log controller, when executed by the processor, configured to receive a plurality of log strings and aggregate the plurality of log strings into a log group; and a scoring controller, when executed by the processor, configured to:

compare the plurality of digests to the log group to generate a plurality of scores correlating the plurality of digests to the log group, select a source code repository from the plurality of source code repositories according to the plurality of scores, and associate the log group to a service corresponding to the source code repository, wherein the source code repository corresponds to the digest with a highest score of the plurality of scores.

12. The system of claim 11, wherein the score comprises a repository score and a Levenshtein ratio.

13. The system of claim 11, wherein the digest controller creates the plurality of digests by collecting a plurality of event strings from the plurality of source code repositories.

14. The system of claim 11, wherein the digest controller creates the plurality of digests by removing a plurality of common strings from a plurality of event strings based on frequencies of the plurality of common strings.

15. The system of claim 11, wherein the digest controller creates the plurality of digest by forming the plurality of digests with a plurality of event strings using a threshold.

16. The system of claim 11, wherein the log controller aggregates the plurality of log strings using metadata available in lines of the plurality of log strings and is further configured to aggregate the plurality of log files based on log metadata.

17. The system of claim 11, wherein the plurality of event strings comprises an event string including metadata comprising at least one of a log index and an instance of a hostname.

18. The system of claim 11, wherein the scoring controller compares the plurality of digests by comparing keywords of a plurality of digests to a plurality log groups to generate a set of scores comprising the plurality of scores.

19. The system of claim 11, wherein a higher value of the score corresponds to matching a longer string between the plurality of digests and the log group.

20. A method comprising:

receiving a plurality of event strings from a plurality of source code repositories;

creating, for the plurality of source code repositories, a plurality of digests of keywords;

receiving a plurality of log strings;

aggregating the plurality of log strings to a log group;

comparing the plurality of digests to the log group to generate a plurality of scores correlating the plurality of digests to the log group;

associating the log group to a service corresponding to a source code repository selected from the plurality of source code repositories using the plurality of scores;

receiving from a user interface a request associated with a user-selected log event, the user-selected log event comprising a first log string and first metadata;

determining from the first metadata a first log group associated with the metadata; and transmitting to the user interface a notification message identifying a service associated with the first log group.

* * * * *